(12) United States Patent  
Kim et al.

(10) Patent No.: US 8,741,475 B2
(45) Date of Patent: Jun. 3, 2014

(54) SECONDARY BATTERY

(75) Inventors: Dukjung Kim, Yongin-si (KR); Jongseok Moon, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/231,896

(22) Filed: Sep. 13, 2011

(65) Prior Publication Data  
US 2012/0189907 A1    Jul. 26, 2012

(30) Foreign Application Priority Data  
Jan. 26, 2011    (KR) .................. 10-2011-0007785

(51) Int. Cl.  
*H01M 2/02*    (2006.01)

(52) U.S. Cl.  
USPC .......................................... 429/179; 429/163

(58) Field of Classification Search  
USPC ................................................. 429/179, 163  
See application file for complete search history.

(56) References Cited

U.S. PATENT DOCUMENTS

| | | | |
|---|---|---|---|
| 8,142,922 B2 * | 3/2012 | Kozuki et al. | 429/161 |
| 2004/0191612 A1 | 9/2004 | Akita et al. | |
| 2010/0143773 A1 * | 6/2010 | Honbou | 429/94 |
| 2011/0008661 A1 * | 1/2011 | Kozuki et al. | 429/94 |
| 2011/0070471 A1 * | 3/2011 | Cho | 429/94 |

FOREIGN PATENT DOCUMENTS

| | | |
|---|---|---|
| EP | 2 244 328 A2 | 10/2010 |
| EP | 2 249 416 A1 | 11/2010 |
| JP | 2008-185850 | 7/1996 |
| JP | 2002-100342 A | 4/2002 |
| JP | 2004-303500 A | 10/2004 |
| JP | 2006-228551 | 8/2006 |
| JP | 2007-200850 | 8/2007 |
| JP | 2007-324043 A | 12/2007 |
| JP | 2010-231945 A | 10/2010 |
| KR | 10-2010-0102542 | 9/2010 |

OTHER PUBLICATIONS

Machine translation for JP-2008-185850, Jul. 16, 1996, 7 pages.  
Machine translation for JP-2010-231945A, Oct. 14, 2010, 15 pages.  
KIPO Office action dated Jun. 22, 2012 for Korean priority Patent Application 10-2011-0007785 3 pages.  
European Search Report dated May 21, 2012, for corresponding European Patent application 11176035.1, (5 pages).  
Patent Abstracts of Japan, and English machine translation of Japanese Publication 2006-228551, (13 pages).  
KIPO Notice of Allowance dated Jun. 21, 2013 for corresponding KR Application No. 10-2011-0007785 (5 pages).  
Machine English Translation of JP 2002-100342 A (11 pages), Apr. 5, 2002.  
Machine English Translation of JP 2007-324043 A (24 pages), Dec. 13, 2007.

* cited by examiner

*Primary Examiner* — Mark F Huff  
*Assistant Examiner* — Monique Wills  
(74) *Attorney, Agent, or Firm* — Christie, Parker & Hale, LLP

(57) ABSTRACT

A secondary battery includes an electrode assembly, a collector plate electrically connected to the electrode assembly and having a bottom surface support portion facing a bottom surface of the electrode assembly, and a case surrounding the electrode assembly and the collector plate.

13 Claims, 5 Drawing Sheets

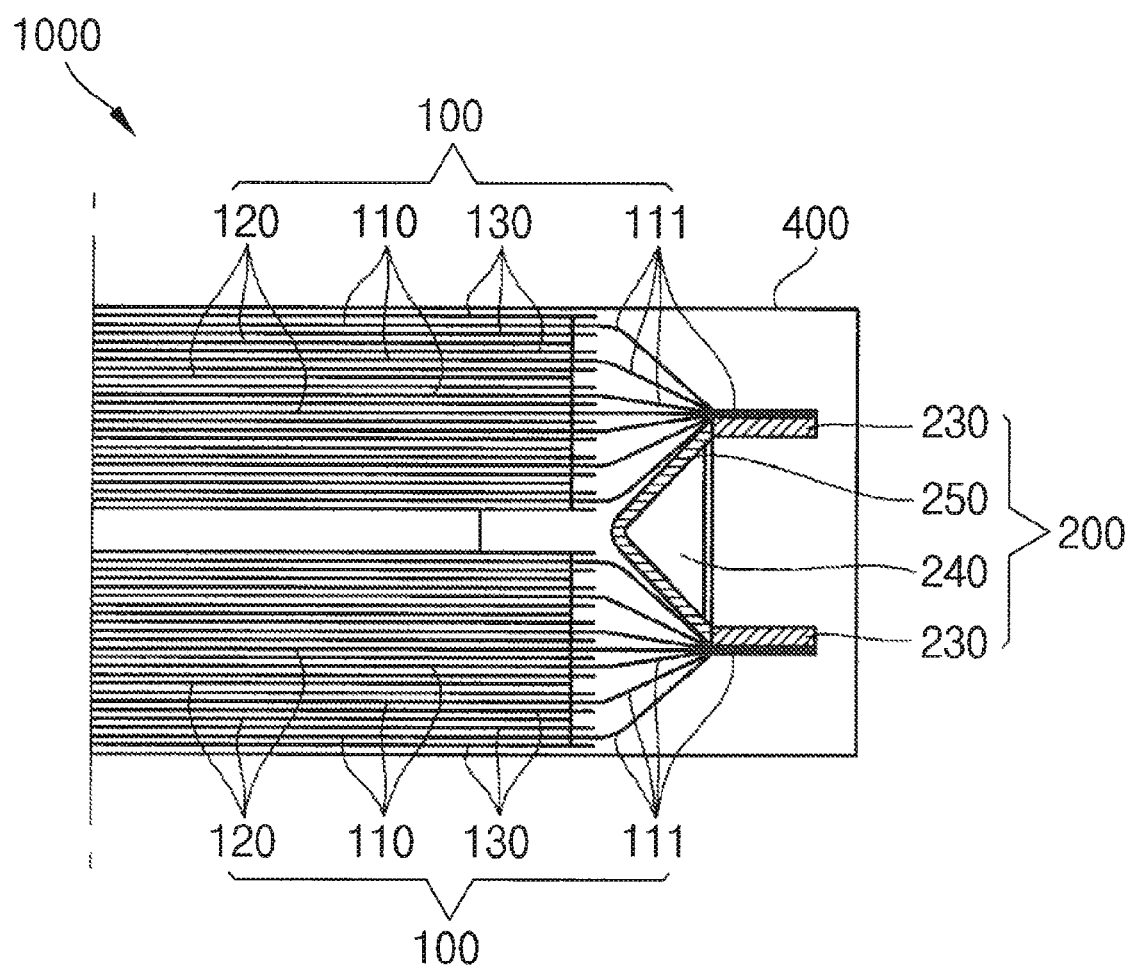

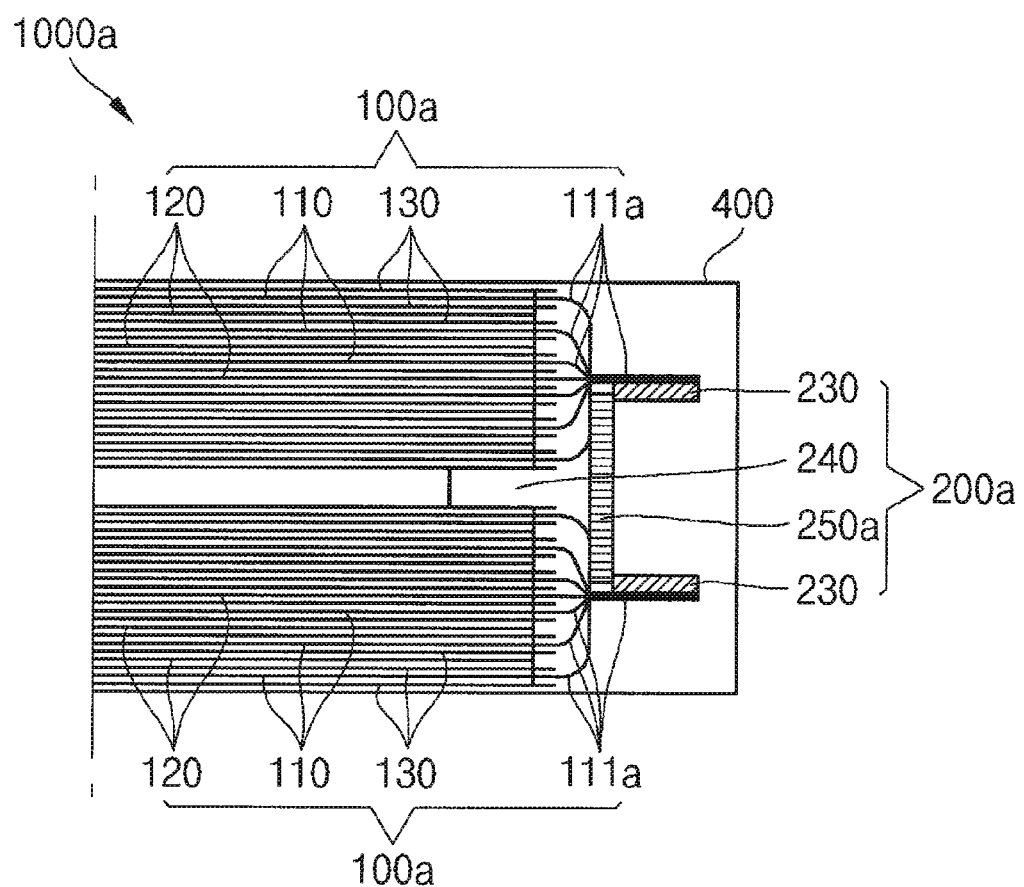

SECONDARY BATTERY

CROSS-REFERENCE TO RELATED APPLICATION

This application claims priority to and the benefit of Korean Patent Application No. 10-2011-0007785, filed on Jan. 26, 2011, the entire content of which is incorporated herein by reference.

BACKGROUND

1. Field

Embodiments of the present invention relate to a secondary battery.

2. Description of the Related Art

In a secondary battery, an electrode assembly is fixed to and housed within a case by an uncoated portion which is fixed to a current collector. In order to improve reliability, a secondary battery generally includes a current collector which is constructed to tightly fix the electrode assembly to restrict its movement even when subjected to external impacts.

SUMMARY

Embodiments of the present invention are directed to a secondary battery including a current collector having a structure for fixing an electrode assembly to provide protection for the electrode assembly against damage.

According to one embodiment of the present invention, a secondary battery includes an electrode assembly, a collector plate electrically connected to the electrode assembly and having a bottom surface support portion facing a bottom surface of the electrode assembly, and a case surrounding the electrode assembly and the collector plate.

A surface of the bottom surface support portion facing a bottom surface of the electrode assembly may be shaped to correspond to the bottom surface of the electrode assembly.

The collector plate may include a side surface support portion facing one side surface of the electrode assembly.

The bottom surface support portion may extend in parallel with the bottom surface of the electrode assembly from a lower end of the side surface support portion to the electrode assembly.

The electrode assembly may include a plurality of electrode assemblies, and the side surface support portion may be located between a plurality of electrode uncoated portions of neighboring electrode assemblies of the electrode assemblies to face the side surfaces of respective ones of the neighboring electrode assemblies.

The side surfaces of the electrode assemblies may be planar.

The secondary battery may further include a cap assembly including a cap plate sealing a top opening of the case, and an electrode terminal penetrating the cap plate.

The collector plate may include a terminal connecting portion located between an upper portion of the electrode assembly and a lower portion of the cap assembly, and a top surface support portion located at one side of the terminal connecting portion.

The top surface support portion may include an extending surface extending from one end of the terminal connecting portion toward the upper portion of the electrode assembly, and supporting surfaces extending from the extending surface in a direction substantially parallel with the top surface of the electrode assembly.

A surface of the supporting surfaces that faces the top surface of the electrode assembly may be shaped to correspond to the top surface of the electrode assembly.

The collector plate may further include a plurality of connecting portions extending between the top surface support portion and the bottom surface support portion from opposing sides of the terminal connecting portion.

The connecting portions may be welded to a plurality of electrode uncoated portions of the electrode assembly.

The collector plate may be spaced apart from an inner wall of the case.

As described above, the secondary battery according to one embodiment of the present invention can prevent an electrode assembly from moving or restrict the movement of an electrode assembly inside a case.

In addition, the secondary battery according to one embodiment of the present invention can increase the energy density of the secondary battery.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which:

FIG. 4 is a partial cross-sectional view of the secondary battery of FIG. 1, taken along line Y-Y; and FIG. 5 is a partial cross-sectional view of a secondary battery according to another embodiment of the present invention.

DETAILED DESCRIPTION

Hereinafter, embodiments of the present invention will be described with reference to the accompanying drawings.

Figure 1:
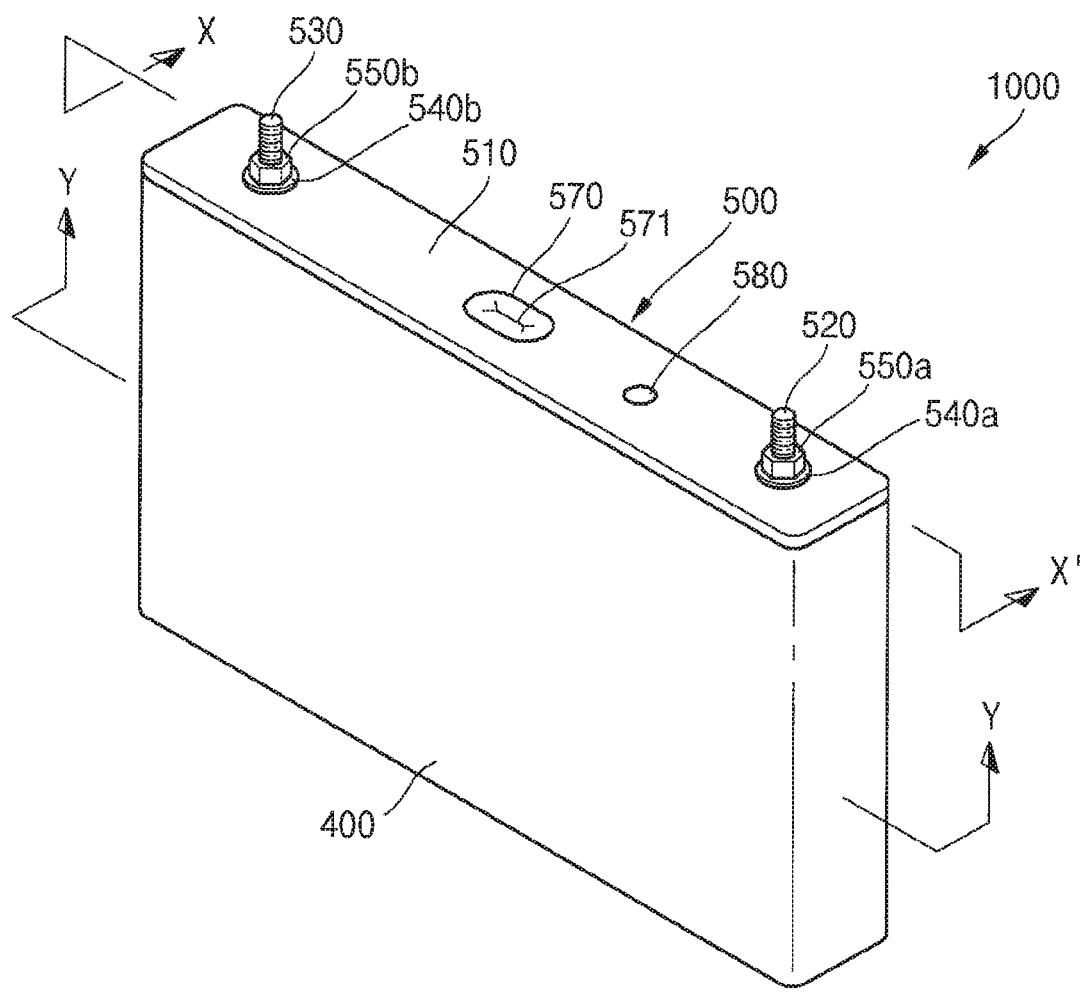
FIG. 1 is a perspective view of a secondary battery according to an embodiment of the present invention.
Figure 2:
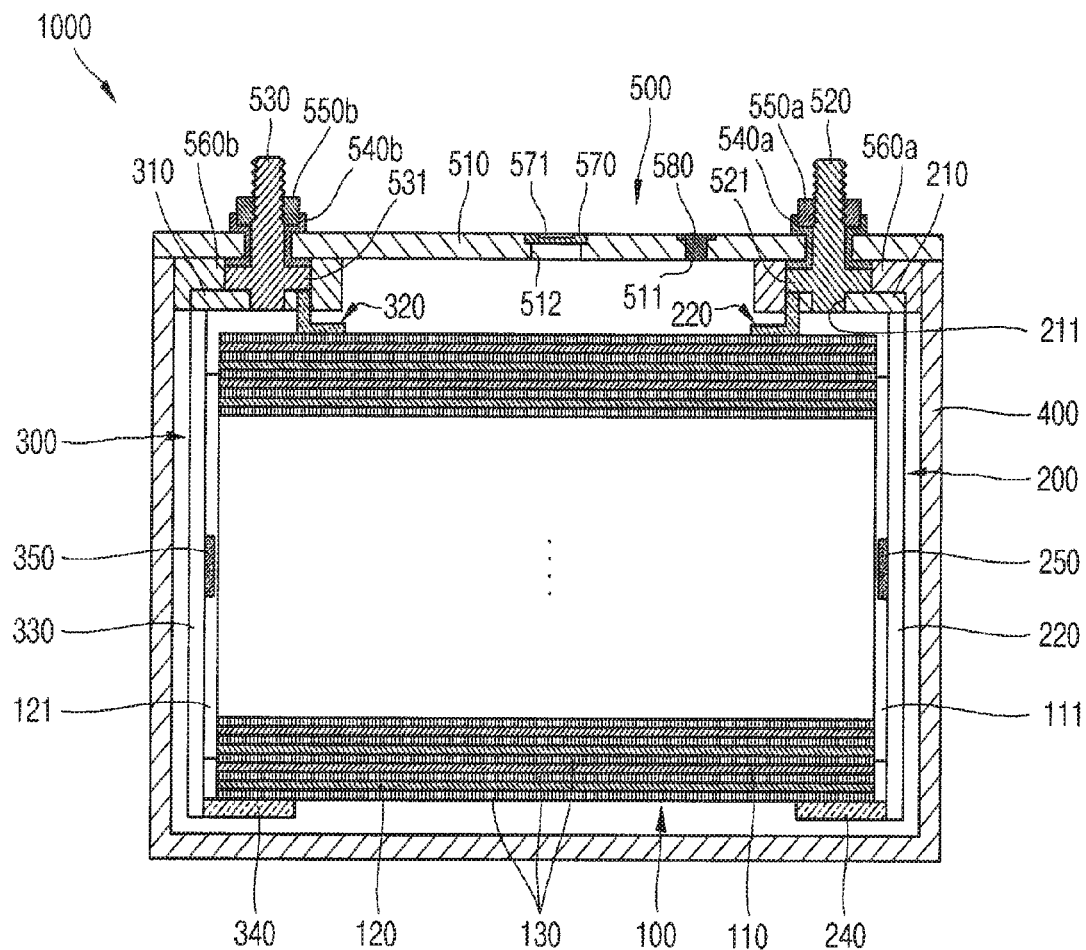
FIG. 2 is a cross-sectional view of the secondary battery of FIG. 1, taken along line X-X.
Figure 3:
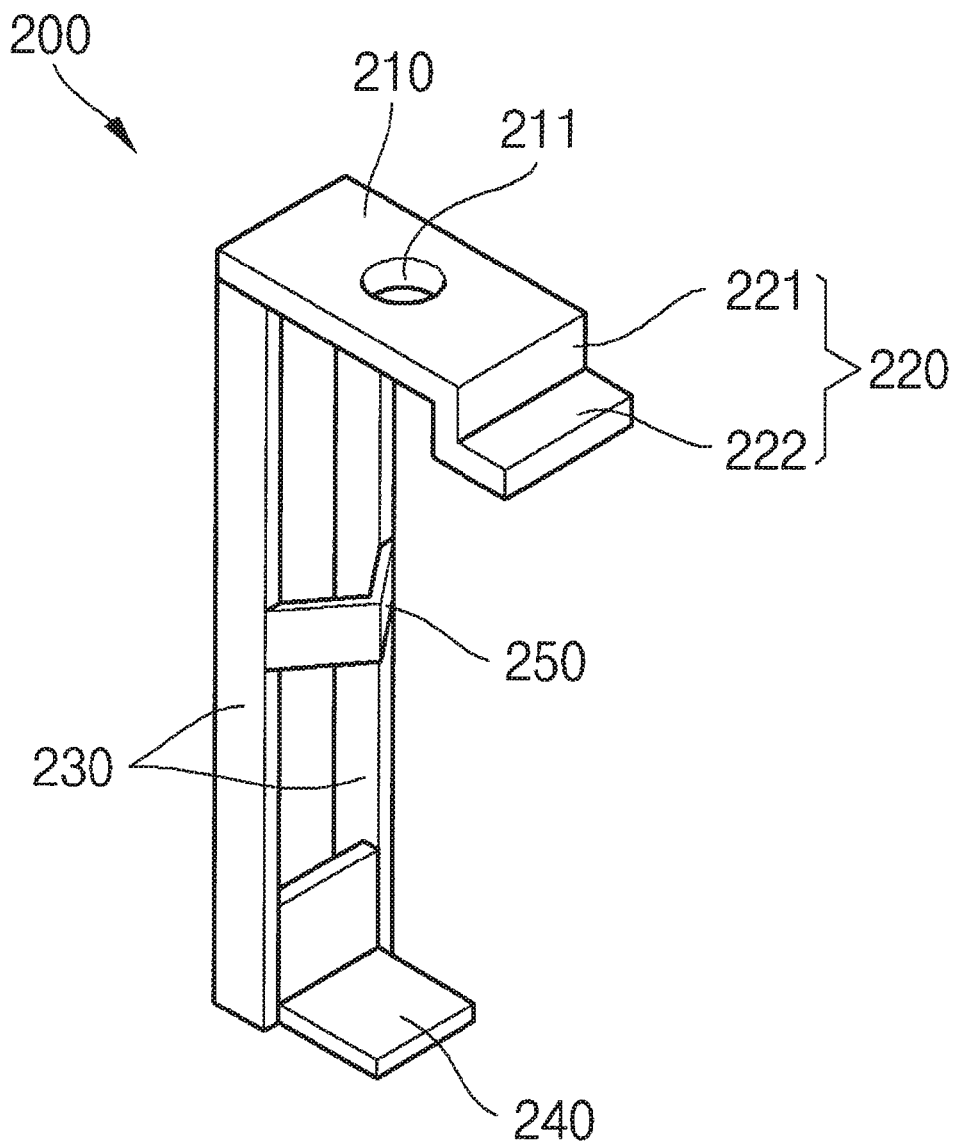
FIG. 3 is a perspective view of a current collector according to an embodiment of the present invention.

FIG. 1 is a perspective view of a secondary battery according to an embodiment of the present invention, FIG. 2 is a cross-sectional view of the secondary battery of FIG. 1, taken along line X-X, FIG. 3 is a perspective view of a current collector according to an embodiment of the present invention, and FIG. 4 is a partial cross-sectional view of the secondary battery of FIG. 1, taken along line Y-Y.

Referring to FIGS. 1, 2, 3 and 4, the secondary battery 1000 according to an embodiment of the present invention includes at least one electrode assembly 100, a first collector plate 200, a second collector plate 300, a case 400 and a cap assembly 500.

The electrode assembly 100 includes a first electrode plate 110, a second electrode plate 120 and a separator 130, which are thin film- or layer-shaped.

In one embodiment, the first electrode plate 110 is formed by coating a first electrode active material such as a transition metal oxide on a first electrode current collector formed of a metal foil made of a material such as aluminum, and includes a first electrode uncoated portion 111 that has no first electrode active material coated thereon. The first electrode uncoated portion 111 becomes (or provides) a path for current to flow (e.g., a current path) between the first electrode plate 110 and the outside of the first electrode plate 110. In other embodiments of the present invention, the first electrode plate 110 may be made of materials other than the materials listed above.

The second electrode plate 120 is formed by coating a second electrode active material such as graphite or carbon on a second electrode current collector formed of a metal foil made of a material such as nickel or copper, and includes a second electrode uncoated portion 112 that has no second electrode active material coated thereon. The second electrode uncoated portion 112 becomes (or provides) a path for current to flow (e.g., a current path) between the second electrode plate 120 and the outside of the second electrode plate 120. In other embodiments of the present invention, the second electrode plate 120 may be made of materials other than the materials listed above.

In one embodiment, the first electrode plate 110 and the second electrode plate 120 serve as a positive electrode and a negative electrode, respectively. In another embodiment, the polarities of the first electrode plate 110 and the second electrode plate 120 are reversed, such that the first electrode plate and the second electrode plate serve as the negative electrode and positive electrode, respectively.

The separator 130 is positioned between the first electrode plate 110 and the second electrode plate 120 to prevent an electrical short circuit (e.g., to provide electrical insulation) therebetween and to allow lithium ions to move. The separator 130 may be wider than a portion of the second electrode plate 120 coated with the second electrode active material in order to prevent or reduce the risk of an electrical short between the first electrode plate 110 and the second electrode plate 120. In addition, the separator 130 may be made of polyethylene, polypropylene or a composite film thereof. In other embodiments of the present invention the separator 130 may be made of materials other than the materials listed above.

The electrode assembly 100 may be formed by sequentially stacking the separator 130, the first electrode plate 110, the separator 130, and the second electrode plate 120 and winding the stacked structure. A plurality of first electrode uncoated portions 111 may be drawn out (or protrude) to one side of the electrode assembly 100. The plurality of first electrode uncoated portions 111 may converge toward the center of the electrode assembly 100 along the thickness of the electrode assembly 100. The one side of the electrode assembly 100 may have a convex shape with respect to the inner wall of the case 400.

The electrode assembly 100 is housed in the case 400 together with an electrolyte (e.g., the case 400 may surround or contain the electrode assembly 100 together with an electrolyte). The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$, or $LiBF_4$. In addition, the electrolyte may be a liquid, a solid or a gel.

Referring to FIG. 3, the first collector plate 200 includes a first terminal connecting portion 210, a first top surface support portion 220, first connecting portions 230, a first bottom surface support portion 240 and a first side surface support portion 250. The first collector plate 200 is made of a conductive material such as aluminum. In addition, the first collector plate 200 is coupled to the first electrode uncoated portion 111 protruding at one side of the electrode assembly 100 so that the first collector plate 200 is electrically connected to the first electrode plate 110. In addition, the first collector plate 200 is spaced apart from the case 400 so as not to contact the inner wall of the case 400.

The first terminal connecting portion 210 has a plate shape and is located between an upper portion of the electrode assembly 100 and a lower portion of the cap assembly 500. In addition, the first terminal connecting portion 210 includes a first terminal hole 211. The first terminal connecting portion 210 has a first terminal hole 211 in a thickness direction (e.g., in a direction perpendicular to the plane of the plate). In addition, a first electrode terminal 520, which will be described in more detail later, is inserted through the first terminal hole 211 to be connected to the first terminal connecting portion 210.

The first top surface support portion 220 is located at one end of the first terminal connecting portion 210. In one embodiment, the first top surface support portion 220 is a stepped portion and includes a first extending surface 221 extending from one end of the first terminal connecting portion 210 toward the electrode assembly 100 (e.g., downwardly in FIG. 2), and first supporting surfaces 222 extending from the first extending surface 221 in a direction parallel with the top surface of the electrode assembly 100. The first supporting surfaces 222 prevent or restrict the electrode assembly 100 from moving toward the cap assembly 500 (e.g., upwardly in FIG. 2) in the case 400.

Further, a portion of the first supporting surfaces 222, which faces the top surface of the electrode assembly 100, may be shaped to correspond to a shape of the top surface of the electrode assembly 100.

The first connecting portions 230 extend from opposing sides of the first terminal connecting portion 210 into the case in a direction substantially perpendicular to the cap plate 500. In one embodiment, the first connecting portions 230 are welded to the first electrode uncoated portion 111 of the electrode assembly 100.

The first bottom surface support portion 240 extends in a direction from a bottom end of the first connecting portions 230 toward the electrode assembly 100 in a direction parallel with the bottom surface of the electrode assembly 100. The first bottom surface support portion 240 faces the bottom surface of the electrode assembly 100, thereby preventing or restricting the electrode assembly 100 from moving in the case 400 away from the cap assembly 500 (e.g., downwardly in FIG. 2). In addition, a surface of the first bottom surface support portion 240, which faces the bottom surface of the electrode assembly 100, may be shaped to correspond to a shape of the bottom surface of the electrode assembly 100. In the embodiment illustrated in FIG. 2, the first top surface support portion 220 and the first bottom surface support portion 240 are substantially flat to correspond to respective substantially flat top and bottom surfaces of the electrode assembly 100. In other embodiments, the first top surface support portion 220 and the first bottom surface support portion 240 have rounded shapes to correspond to rounded top and bottom surfaces of the electrode assembly 100.

The first side surface support portion 250 is located between the first terminal connecting portion 210 and the first bottom surface support portion 240. The first side surface support portion 250 protrudes from the first connecting portions 230 toward one side of the electrode assembly 100. In addition, the first side surface support portion 250 is located between first electrode uncoated portions 111 of neighboring (or adjacent) electrode assemblies 100, and faces sides of the respective neighboring electrode assemblies 100 in parallel with the sides. Thus, referring to FIGS. 3 and 4, the first side surface support portion 250 is substantially wedged shaped. The first side surface support portion 250 prevents or restricts the electrode assembly 100 from moving laterally in the case 400 (e.g., left and right in FIG. 2). In addition, the first side surface support portion 250 prevents or restricts the electrode assembly 100 from moving in a direction of width of the case 400 by being wedged-shaped.

The second collector plate 300 includes a second terminal connecting portion 310, a second top surface support portion 320, second connecting portions 330, a second bottom surface support portion 340 and a second side surface support portion 350. The second collector plate 300 is made of a conductive material such as copper. In addition, the second collector plate 300 is coupled to the second electrode uncoated portion 121 protruding to the other end of the electrode assembly 100 so that it is electrically connected to the second electrode plate 120. Because the second collector plate 300 is located and shaped to correspond to the first collector plate 200 and serves substantially the same function as the first collector plate 200, repeated descriptions thereof will not be given.

The case 400 has the shape of a rectangular box (or prism) and has a top opening. The peripheral portion of the cap assembly 500 substantially corresponds to the top opening of the case 400. The electrode assembly 100, the first collector plate 200 and the second collector plate 300 are received (or inserted into the case 400) through the top opening of the case 400.

The case 400 may be made of a conductive metal such as aluminum, an aluminum alloy or nickel plated steel. In addition, the interior surface of the case 400 may be insulated, so that the case 400 is electrically insulated from the electrode assembly 100, the first collector plate 200, the second collector plate 300 and the cap assembly 500. In some embodiments, the case 400 is electrically connected to a cap plate 510, which will later be described, to then serve as an electrode having a polarity.

The cap assembly 500 includes a cap plate 510, a first electrode terminal 520, a second electrode terminal 530, gaskets 540a and 540b, and nuts 550a and 550b. The cap assembly 500 may further include lower insulation members 560a and 560b, a vent plate 570 sealing a vent hole 512 and a plug 580 sealing an electrolyte injection hole 511.

The cap plate 510 includes an electrolyte injection hole 511 and a vent hole 512. The cap plate 510 is sized and shaped to fit the top opening of the case 400. In addition, the peripheral portion of the cap plate 510 is welded to the top opening of the case 400 to seal the top opening of the case 400. The cap plate 510 may made of the same material as the case 400 to facilitate welding between the cap plate 510 and the case 400.

The electrolyte injection hole 511 passes through one side of the cap plate 510 in a thickness direction (e.g., a direction parallel to the plane of the cap plate). After the top opening of the case 400 is sealed by the cap plate 510 and therefore the electrolyte injection hole 511 is a path for injecting an electrolyte into the case 400.

The vent hole 512 is located approximately in the center of the cap plate 510 and penetrates through the cap plate 510 in the thickness direction. In addition, a vent plate 570, which will later be described, is located in the vent hole 512.

The first electrode terminal 520 penetrates one side of the cap plate 510 and is electrically connected to the first collector plate 200. The first electrode terminal 520 may have a pillar shape. A thread is located on an outer circumferential surface of an upper portion of the first electrode terminal 520 upwardly exposed from the cap plate 510, and a flange 521 is located on a lower portion of the first electrode terminal 520 below the cap plate 510 to prevent or restrict the first electrode terminal 520 from being dislodged from the cap plate 510.

The second electrode terminal 530 penetrates the other side of the cap plate 510 (e.g., a side of the cap plate 510 opposite the side penetrated by the first electrode terminal 520) and is electrically connected to the second collector plate 300. The second electrode terminal 530 may have a pillar shape. A thread is located on an outer circumferential surface of an upper portion of the second electrode terminal 530 upwardly exposed from the cap plate 510, and a flange 531 is located on a lower portion of the second electrode terminal 530 below the cap plate 510 to prevent or restrict the second electrode terminal 530 from being dislodged from the cap plate 510.

The electrode terminals 520 and 530 serve as paths (e.g., current paths) that electrically connect positive and negative electrodes of the electrode assembly 100 to an external device.

The gaskets 540a and 540b are located between the first electrode terminal 520 and the cap plate 510 and between the second electrode terminal 530 and the cap plate 510 to seal portions between the electrode terminals 520 and 530 and the cap plate 510. Therefore, the gaskets 540a and 540b prevent (or reduce) external moisture from permeating into the secondary battery 1000 or prevent (or reduce) the electrolyte accommodated in the secondary battery 1000 from being effused (or diffused) outside. The gaskets 540a and 540b are made of insulating materials. Therefore, the gaskets 540a and 540b insulate the electrode terminals 520 and 530 from the cap plate 510.

The nuts 550a and 550b are engaged with the threads of the first and second electrode terminals 520 and 530. Thus, the nuts 550a and 550b serve to fix the first and second electrode terminals 520 and 530 to the cap plate 510, respectively.

The lower insulation members 560a and 560b are located between the first terminal connecting portion 210 of the first collector plate 200 and the cap plate 510 and between of the second terminal connecting portion 310 the second collector plate 300 and the cap plate 510. In addition, the lower insulation members 560a and 560b surround the lower pillar of the first electrode terminal 520 and the lower pillar of the second electrode terminal 530, respectively. Thus, the lower insulation members 560a and 560b electrically insulate the terminal connecting portions 210 and 310 of the collector plates 200 and 300 from the cap plate 510.

The vent plate 570 is installed in the vent hole 512 of the cap plate 510. In addition, the vent plate 570 includes a notch 571 designed to open at a pressure (e.g., a preset pressure). When the internal pressure of the secondary battery 1000 exceeds the preset pressure, the notch 571 is fractured and internal gases are released from the secondary battery 1000, thereby improving safety in use of the secondary battery 1000.

Once the top opening of the 400 is sealed by the cap plate 510, the plug 580 seals an electrolyte injection hole 511 of the cap plate 510.

As described above, the secondary battery 1000 according to one embodiment of the present invention includes collector plates 200 and 300 respectively having top surface support portions 220 and 320, bottom surface support portions 240 and 340 and side surface support portions 250 and 350, thereby restricting the movement of the electrode assembly 100 within the case 400. Therefore, the secondary battery 1000 according to one embodiment of the present invention prevents or reduces the likelihood of the electrode assembly 100 and the collector plate 200 from being mechanically and electrically disconnected from each other due to external impacts.

Next, a secondary battery according to another embodiment of the present invention will be described with reference to FIG. 5. FIG. 5 is a partial cross-sectional view of a secondary battery according to another embodiment of the present invention.

The secondary battery 1000a according to the embodiment of the present invention illustrated in FIG. 5 is substantially the same as the secondary battery 1000 according to the previous embodiment of the present invention in view of configurations and functions, except for the shapes of opposing side surfaces of the electrode assembly and shapes of side surface support portions of a collector plate. Thus, the following description of the secondary battery 1000a will focus on the shape of side surfaces of an electrode assembly 100a and a side surface support portion 250a of a collector plate 200a, and descriptions of the other components will not be repeated.

Referring to FIG. 5, a plurality of first electrode uncoated portions 111a may be drawn out (or protrude) to one side of the electrode assembly 100a. The plurality of first electrode uncoated portions 111a may converge toward the center of the electrode assembly 100a in the thickness direction. One side surface of the electrode assembly 100a is substantially planar.

Meanwhile, the side surface support portion 250a of the collector plate 200a is located between first electrode uncoated portions 111a of two neighboring electrode assemblies 100a and faces one side surface of each of the two neighboring electrode assemblies 100a. Thus, referring to FIG. 5, the surface of the first side surface support portion 250a facing the side surface of the electrode assembly 100a is substantially planar. The first side surface support portion 250a prevents or restricts the electrode assemblies 100a from laterally moving inside the case 400.

In addition to the above-stated effect of preventing or restricting the electrode assemblies 1000a from moving inside the case 400, the secondary battery 1000a may further increase the energy capacity relative to the volume, compared to the secondary battery 1000 according to the previous embodiment. That is, in the secondary battery 1000a according to the embodiment, because the side surface of the electrode assembly 100a is planar, a larger area may be coated with an electrode active material compared to the electrode assembly 1000 having a convex side surface, such that the energy capacity relative to the total volume of the battery can be further increased.

Although exemplary embodiments of the present invention have been described, those skilled in the art will understand that various modifications and variations can be made without departing from the spirit and scope of the present invention as disclosed in the accompanying claims and equivalents thereof.

What is claimed is:

1. A secondary battery comprising:
an electrode assembly;
a collector plate electrically connected to the electrode assembly and having a bottom surface support portion facing a bottom surface of the electrode assembly, a connecting portion coupled to the bottom surface and facing a side surface of the electrode assembly, and a side surface support portion protruding from the connecting portion toward the side surface of the electrode assembly, wherein the bottom surface of the collector plate is at an angle to the side surface of the electrode assembly; and
a case surrounding the electrode assembly and the collector plate, the case having a bottom portion and a side portion at an angle to the bottom portion,
wherein the bottom surface support portion of the collector plate is between the bottom surface of the electrode assembly and the bottom portion of the case, and
wherein the side surface support portion is between the side surface of the electrode assembly and the side portion of the case.

2. The secondary battery of claim 1, wherein a surface of the bottom surface support portion facing a bottom surface of the electrode assembly is shaped to correspond to the bottom surface of the electrode assembly.

3. The secondary battery of claim 1, wherein the bottom surface support portion extends in parallel with the bottom surface of the electrode assembly from a lower end of the side surface support portion to the electrode assembly.

4. The secondary battery of claim 1, wherein the electrode assembly includes a plurality of electrode assemblies, and the side surface support portion is located between a plurality of electrode uncoated portions of neighboring electrode assemblies of the electrode assemblies to face the side surfaces of respective ones of the neighboring electrode assemblies.

5. The secondary battery of claim 4, wherein the side surfaces of the electrode assemblies are planar.

6. The secondary battery of claim 1, further comprising a cap assembly including a cap plate sealing a top opening of the case and an electrode terminal penetrating the cap plate.

7. The secondary battery of claim 6, wherein the collector plate comprises:
a terminal connecting portion located between an upper portion of the electrode assembly and a lower portion of the cap assembly; and
a top surface support portion adjacent to one side of the terminal connecting portion.

8. The secondary battery of claim 7, wherein the top surface support portion comprises:
an extending surface extending from one end of the terminal connecting portion toward the upper portion of the electrode assembly; and
supporting surfaces extending from the extending surface in a direction substantially parallel with the top surface of the electrode assembly.

9. The secondary battery of claim 8, wherein a surface of the supporting surfaces that faces the top surface of the electrode assembly is shaped to correspond to the top surface of the electrode assembly.

10. The secondary battery of claim 7, wherein the collector plate further comprises a plurality of connecting portions extending between the top surface support portion and the bottom surface support portion from opposing sides of the terminal connecting portion.

11. The secondary battery of claim 10, wherein the connecting portions are welded to a plurality of electrode uncoated portions of the electrode assembly.

12. The secondary battery of claim 1, wherein the collector plate is spaced apart from an inner wall of the case.

13. The secondary battery of claim 1, wherein the side surface of the electrode assembly is an uncoated portion of the electrode assembly and the bottom surface of the electrode assembly is a coated portion of the electrode assembly.

* * * * *